United States Patent [19]

Doshi

[11] 4,077,780
[45] Mar. 7, 1978

[54] RECOVERY OF HYDROGEN AND NITROGEN FROM AMMONIA PLANT PURGE GAS

[75] Inventor: Kishore Jasraj Doshi, Mahopac, N.Y.

[73] Assignee: Union Carbide Corporation, New York, N.Y.

[21] Appl. No.: 734,372

[22] Filed: Oct. 20, 1976

[51] Int. Cl.² .............................................. B01D 53/04
[52] U.S. Cl. ............................................ 55/26; 55/62;
        55/66; 55/70; 55/74
[58] Field of Search ................ 55/25, 26, 58, 62, 70,
        55/74, 75, 66; 423/359, 362

[56] References Cited

U.S. PATENT DOCUMENTS

| | | | |
|---|---|---|---|
| 3,343,916 | 9/1967 | Cahn et al. | 423/359 |
| 3,430,418 | 3/1969 | Wagner | 55/25 |
| 3,564,816 | 2/1971 | Batta | 55/26 |
| 3,702,525 | 11/1972 | Simonet et al. | 55/70 X |
| 3,720,042 | 3/1973 | Simonet | 55/25 |

Primary Examiner—Charles N. Hart
Assistant Examiner—Robert H. Spitzer
Attorney, Agent, or Firm—Steven J. Hultquist

[57] ABSTRACT

An adiabatic pressure swing adsorption process for separating gas mixtures containing ammonia, argon, methane, nitrogen and hydrogen to recover hydrogen and nitrogen product in which four adsorbent beds are joined so that the adsorbate loaded bed is pressure equalized with two other beds in staged sequence.

9 Claims, 8 Drawing Figures

RECOVERY OF HYDROGEN AND NITROGEN FROM AMMONIA PLANT PURGE GAS

BACKGROUND OF THE INVENTION

1. Field of the Invention

This invention relates to a process for recovering hydrogen and nitrogen from a gas mixture containing ammonia, argon, methane and said hydrogen and nitrogen by adiabatic pressure swing adsorption.

2. Description of the Prior Art

In the synthesis of ammonia by a conventional Haber-type process, it is essential that the hydrogen- and nitrogen-containing feed gas be properly purified prior to introduction to the catalytic ammonia conversion step. Catalytic reforming of natural gas is frequently employed to provide feed gas for the ammonia conversion. Such reforming produces carbon monoxide and hydrogen from the natural gas, with the carbon monoxide being subjected to a water-gas shift reaction to yield carbon dioxide and hydrogen. Secondary reforming of the reactant gas mixture is then conducted, with compressed air being added to provide the nitrogen component of the synthesis feed gas and the oxygen in the added air being stoichiometrically reacted with hydrogen in the reactant gas mixture to form water. The addition of air is controlled in the secondary reforming operation so that the effluent gas from the reformers contains a three to one molar ratio of hydrogen to nitrogen. This effluent gas is then subjected to purification treatment as for example scrubbing by ammonia wash liquid for removal of carbon monoxide and carbon dioxide contaminants and the resulting purified synthesis gas is compressed and passed to the ammonia converter catalytic synthesis step.

In the ammonia converter, the nitrogen and hydrogen in the synthesis feed gas are reacted to form ammonia. The reaction product gas from this step is then phase separated to remove liquid ammonia product therefrom and the unreacted gas, containing substantial amounts of reactant hydrogen and nitrogen, is recycled in a circulation loop and joined with the fresh synthesis gas being passed to the ammonia converter. The gas in the circulation loop contains, in addition to the reactant hydrogen and nitrogen, small amounts of ammonia vapor, unreformed methane from the natural gas feed and argon entering with the air in the secondary reforming step. A typical composition of such circulation gas is as follows (percent by volume):

hydrogen = 60 – 65%
nitrogen = 20 – 24%
methane = 8 – 12%
argon = 3 – 6%
ammonia = 1 – 3%

Thus, the ammonia converter circulation loop represents an accumulation point in the ammonia synthesis system for those constituents—e.g., methane and argon—which are "inert" with respect to the synthesis reaction carried out in the ammonia converter. The inert constituents accumulate in the recycle gas passed to the ammonia converter and adversely affect the overall process by lowering the yield efficiency and capacity of the ammonia converter. Accordingly, it has been common practice in the art to purge a portion of the recycle gas from the circulation loop by venting of same, so as to maintain the concentration of inert constituents at a suitably low level. For example a conventional ammonia plant based on catalytic reforming of natural gas to provide feed gas for the ammonia synthesis step may vent recycle gas from the circulation loop at a rate corresponding to approximately 6-8% of the synthesis feed gas, in order to limit the buildup of the principal inert constituents—i.e., methane and argon—to about 15% by volume. This vented purge gas is typically returned to the reformer furnaces and burned as fuel therein in order to realize the benefit of its comparatively high BTU heating value.

It is apparent from the foregoing discussion that venting of purge gas from the ammonia converter circulation loop entails a significant loss of potential reactant hydrogen and nitrogen from the loop. This loss is associated with an economic penalty for such mode of treatment inasmuch as the hydrogen and nitrogen constituents in the purge have a significantly higher value as synthesis feed gas compared to their use as fuel.

Faced with the problem of loss of the valuable reactant constituents in the vented purge gas, the prior art has in certain instances employed cryogenic separation systems for treatment of the purge gas stream to recover hydrogen and nitrogen for subsequent recirculation to the ammonia converter. Although cryogenic separation systems are able to achieve high recovery of hydrogen and nitrogen from the vented purge gas stream, the large equipment, operating and maintenance costs associated with such systems have limited their application.

Ideally, a processing system treating the ammonia plant purge gas should recover the hydrogen, nitrogen and ammonia, in that order of importance, while rejecting all of the argon and methane inert constituents. Such a processing system must operate reliably with a minimum of operating attention and have no significant adverse effect on operation of the remainder of the ammonia plant.

In an effort to provide an ammonia plant purge gas treatment system which satisfies the above-identified performance criteria and is economically attractive, the prior art has proposed the use of adiabatic pressure swing adsorption systems for the removal and recovery of the hydrogen constituent in the purge gas. Adiabatic pressure swing adsorption systems are well known in the gas separation art and have demonstrated utility in a variety of applications, e.g., the treatment of raw natural gas to remove water and heavy hydrocarbons therefrom. Unfortunately, the prior art systems developed to date for ammonia plant purge gas treatments have not been able to provide substantial recovery of both nitrogen and hydrogen constituents. Faced with such inability to recover both constituents in quantity, the prior art pressure swing adsorption systems have been designed and operated to provide high recovery of hydrogen at high purity, as for example 99.5 volume percent hydrogen. In these systems, the other synthesis feed gas constituents, i.e., nitrogen, methane, argon and ammonia are selectively adsorbed from the purge gas at higher pressure and desorbed from the adsorbent at lower pressure with the desorbate being vented from the system as waste gas to the atmosphere. The high purity hydrogen product recovered by the adsorption is then collected and recycled to the ammonia converter along with the synthesis feed gas. Such recovery and recirculation to the synthesis converter of the more valuable hydrogen constituent provides some improvement in the production capacity of the ammonia plant, but such improvement is not as great as that which might be expected based solely on a consideration of the purge gas treatment system. This is due to the fact that additional air must be added to the ammonia plant secondary reforming step in order to maintain a stoichiometric balance of nitrogen to the hydrogen in the feed gas passed to the ammonia converter. The additional introduction of air into the ammonia production process, may be disadvantageous due to existing air compressor limitations. In addition, the level of inert constituents, especially argon in the synthesis feed gas and circulation loop gas is correspondingly increased. As mentioned, increased levels of inert constituents in the feed and circulation loop gas are detrimental to the ammonia process since they reduce the capacity and efficiency of the ammonia converter. In summary, the prior art has not been able to economically remove both nitrogen and hydrogen constituents from the ammonia plant purge gas at desirable high recovery levels.

Accordingly, it is an object of the present invention to provide an improved process for separation of hydrogen and nitrogen from ammonia plant purge gas.

It is another object of the invention to provide an adiabatic pressure swing adsorption system for separation of hydrogen and nitrogen from ammonia plant purge gas at higher nitrogen recovery levels than have been achieved by the pressure swing adsorption systems heretofore employed for such purpose.

These and other objects of the invention will be apparent from the ensuing disclosure and appended claims.

SUMMARY OF THE INVENTION

This invention relates to a process for separating gas mixtures comprising 1-7 volume percent ammonia, 3-8 volume percent argon, 6-12 volume percent methane, 16-25 volume percent nitrogen and the balance hydrogen by selectively adsorbing methane in an adsorption zone at a higher pressure and desorbing methane by pressure reduction to lower pressure, for recovery of hydrogen and nitrogen from the gas mixture.

In this process, four beds of activated carbon selective adsorbent material are provided each with inlet and discharge ends. The feed gas mixture is introduced to the inlet end of a first bed at first highest superatmospheric pressure for flow therethrough with selective adsorption of ammonia and methane and also adsorption of nitrogen and argon and discharge of unadsorbed product effluent comprising hydrogen, nitrogen and argon from the discharge end. Such flow is continued so that a methane adsorption front is established at the inlet end and moves progressively toward the discharge end. This flow is terminated when the methane adsorption front is entirely within the first bed so that the bed remains filled with void space gas at the first highest pressure.

The first bed is first pressure equalized with a second bed and higher intermediate pressure by releasing void space gas from the first bed discharge end and flowing same to the discharge end of the second bed having previously been partially repressurized to lower intermediate pressure. The first bed is cocurrently depressurized by releasing further void space from the discharge end and flowing same into the discharge end of a third bed partially loaded with said methane for countercurrent purging thereof at a lowest pressure. The first bed is second pressure equalized with the third bed at lower intermediate pressure by releasing sufficient additional void space gas from the first bed discharge end for methane breakthrough and flowing same to the third bed immediately after purging the adsorbate therefrom at the lowest pressure for partial repressurization of the third bed to lower intermediate pressure. The inlet end pressure of the first bed is reduced thereby countercurrently desorbing part of the adsorbate and discharging same through the inlet end, and the discharge is continued until the first bed is at the lowest pressure.

Cocurrent depressurization void space gas is introduced from a fourth adsorbent bed to the discharge end of the first bed for flow therethrough countercurrent to the previously flowing gas mixture so as to purge at least part of the remaining absorbate at the lowest pressure and remove same through the bed inlet end. Additional void space gas from the fourth adsorbent bed is introduced to the first bed for partial repressurization thereof until the first and fourth beds are pressure equalized at lower intermediate pressure as the fourth bed second pressure equalizing. Void space gas from the second bed is introduced to the first bed discharge end for further repressurization thereof until the first and second beds are pressure equalized at higher intermediate pressure as the second bed first pressure equalizing. Product effluent is introduced from the third bed to the first bed discharge end for final countercurrent repressurization thereof to pressure above the higher intermediate pressure. The gas mixture is then reintroduced to the inlet end of the repressurized first bed, to reinitiate the adsorption step and thereafter the above-described cycle steps are repeated in sequence, with the same sequence being consecutively followed with the fourth, second and third beds in accordance with the flow cycle sequence of FIG. 3 herein, as described more fully hereinafter.

The above described pressure swing adsorption cycle employed in this invention is of a general type as disclosed and claimed in U.S. Pat. No. 3,564,816 to L. B. Batta in which at least four adsorbent beds are joined and the adsorbate loaded bed after completion of the constant pressure adsorption step is pressure equalized with two other beds in staged sequence for recovery of its void gas; first with an already partially repressurized bed and then with another bed which has just been purged at the lowest pressure of the process. The present invention is based on several related discoveries which permit such type of adsorption process, utilizing four adsorbent beds, to be employed for high recovery of hydrogen and nitrogen from ammonia plant purge gas. Specifically, the present invention is based on the discoveries that (1) activated carbon in the two-pressure equalization adsorption cycle is capable of rejecting substantially larger amounts of argon and methane inert constituents per unit amount of hydrogen and nitrogen recovered than other adsorbents which have heretofore been employed for treatment of ammonia plant purge gas, but (2) activated carbon nonetheless has the apparently disadvantageous characteristic of roughly equal selectivity for nitrogen and argon, and (3) despite such selectivity characteristic, a two-pressure equalization adsorption process can be suitably utilized to realize high recovery of nitrogen by operating beyond methane breakthrough in the second pressure equalization step without adverse effect on the product gas composition. The latter discovery is particularly surprising in view of the fact that the methane constituent is more strongly adsorbed than either nitrogen or argon. Thus, the pressure swing adsorption process of this invention is able to achieve hydrogen recoveries on the order of 75 to 80 percent and nitrogen recoveries of 50 to 60 percent with rejection of 95 percent and higher of the feed gas methane content and such operation is unexpectedly achieved despite the fact that nitrogen, argon and methane are breaking through the previously partially loaded adsorbent bed and passed into another adsorbent bed being repressurized at the end of the second pressure equalization step. Although some nitrogen is lost by selective adsorption in the activated carbon bed and some argon is withdrawn in the nitrogen and hydrogen product stream and thus recycled to the ammonia converter, this is an acceptable balance because substantially all of the methane and a major portion of the argon are rejected and the hydrogen-nitrogen recovery is improved. As discussed hereinabove, the prior art teaches away from this concept by requiring production of high purity hydrogen for return to the ammonia plant. The generalized principles on which the present invention is based, i.e., the use of activated carbon as an adsorbent material and operation past the point of methane breakthrough in the course of the adsorbent bed void gas recovery steps, can be applied in other high performance pressure swing adsorption processes, such as the process disclosed and claimed in U.S. Pat. No. 3,430,418 to J. L. Wagner, but such processes do not obtain the remarkably high nitrogen-hydrogen recovery levels which are characteristic of this invention and the object thereof.

The process of this invention has been utilized to separate hydrogen and nitrogen from ammonia plant purge gas and has the capability for significantly increasing ammonia production in a plant based on catalytic reforming of natural gas, on the order of 2 to 5% for a plant venting purge gas from the circulation loop at a rate of approximately 6% of the synthesis gas feed rate to the ammonia converter. Moreover, the pressure swing adsorption process of this invention is adiabatic in character. Accordingly, the hydrogen and nitrogen product constituents recovered by the process of the invention for recycle to the ammonia converter avoid the thermal losses associated with synthesis gas preparation in the ammonia plant, so that overall thermal efficiency of the ammonia plant is correspondingly improved.

DETAILED DESCRIPTION OF THE PREFERRED EMBODIMENTS

Figure 1:
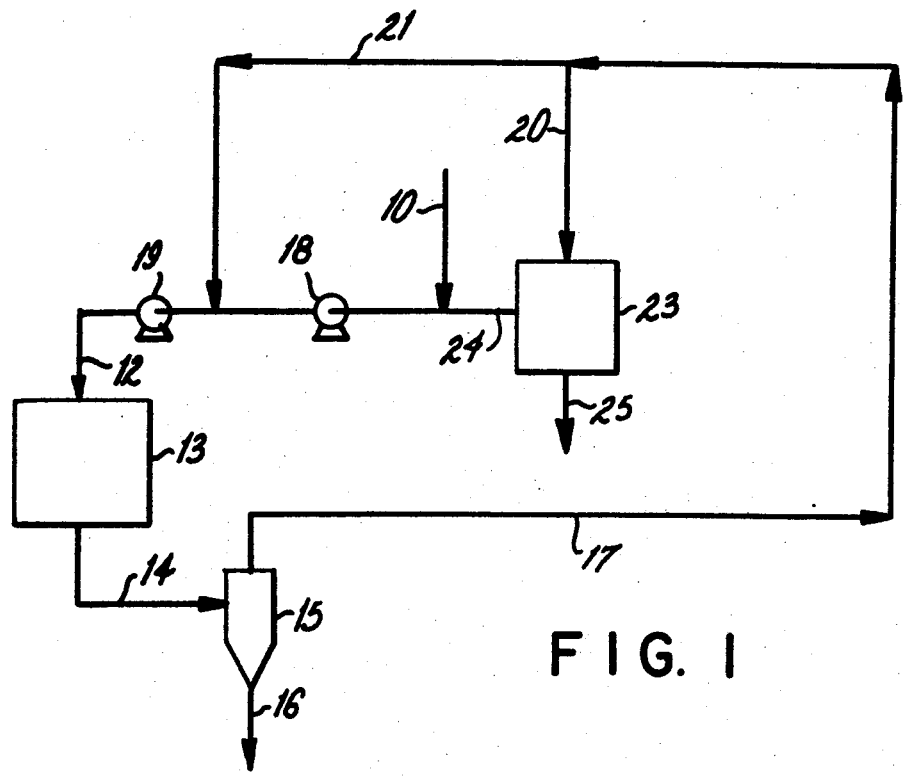
FIG. 1 is a schematic flowsheet of a portion of an ammonia synthesis plant employing the invention.

Referring now to the drawings, FIG. 1 is a schematic flowsheet of a portion of an ammonia synthesis plant employing the invention. Synthesis feed gas mixture, containing hydrogen and nitrogen in an approximately stoichiometric 3:1 molar ratio together with methane and argon inert constituents, enters the system in line 10 and is joined with the product effluent gas in line 24 containing nitrogen and hydrogen, as described more fully hereinafter. The combined gas stream is partially compressed by compressor 18 and then further joined with the circulation loop gas from line 21. The resulting augmented gas mixture is passed by line 12 after compression to higher pressure in compressor 19 to the ammonia converter 13.

In the ammonia converter, hydrogen and nitrogen are catalytically reacted to form ammonia in a well known manner. The reacted gas discharged from the ammonia converter in line 14 contains a substantial fraction of ammonia and this ammonia is removed in line 16 from phase separator 15. The uncondensed gas withdrawn from the phase separator in line 17, part of which is ultimately passed to the adsorption zone, may in the practice of the present invention, broadly comprise 1–7 volume percent ammonia, 3–8 volume percent argon, 6–12 volume percent methane, 16–25 volume percent nitrogen and the balance hydrogen. For most conventional ammonia plants, based on catalytic reforming of natural gas, such gas mixture may more typically comprise 2–4 volume percent ammonia, 4–6 volume percent argon, 10–12 volume percent methane, 19–23 volume percent nitrogen and the balance hydrogen, when the process of the present invention is employed for treatment of the circulation loop gas. It will be understood that hydrogen as referred to herein may include small or trace amounts of helium, such as may be present in the ammonia plant circulation loop gas.

From line 17, the uncondensed circulation loop gas withdrawn from phase separator 15 is split, with a first portion passing into line 20 and the remaining portion entering line 21. The latter is recirculated to the ammonia converter, as previously described.

The first portion of the circulation loop gas in line 20 is flowed to the adsorption zone 23 for separation therein to recover hydrogen and nitrogen as product in line 24. This recovered product gas is joined with the above-described feed gas stream from line 10 for passage to the ammonia converter. The adsorption zone also yields a purged waste gas, containing desorbed constituents, which is vented from the adsorption zone in line 25. This waste gas contains essentially all of the ammonia and methane initially introduced to the absorption zone in the circulation loop gas together with a substantial portion of the argon from the circulation loop gas. The waste gas may be returned to the reformer as fuel or alternatively subjected to further treatment and/or final disposition steps.

In the above-described system, inert constituents of the circulation loop gas are removed from the system with the waste gas vented through line 25. As indicated in the preceding Summary section, the operation of the pressure swing adsorption process in the adsorption zone to recover nitrogen as well as hydrogen causes some recovery of argon to be obtained. Returning this hydrogen, nitrogen and argon to the circulation loop requires operation of the loop at a slightly higher argon concentration but at a reduced methane concentration to maintain the total inerts at the desired level, e.g. less than about 15 volume percent in the circulation loop gas. As mentioned, such operation is suitable because substantially all of the methane and a major portion of the argon in the purge gas feed to the absorption zone are removed in the waste gas rejected therefrom, while the recovery of nitrogen and hydrogen is substantially improved, as compared with an ammonia plant in which inert constituents are removed from the system solely by direct venting from the circulation loop. It will be recognized that some additional air will have to be introduced to the process to bring the hydrogen-nitrogen ratio into these to one balance; however, this addition of air is substantially less than required in the absence of the invention.

Figure 2:
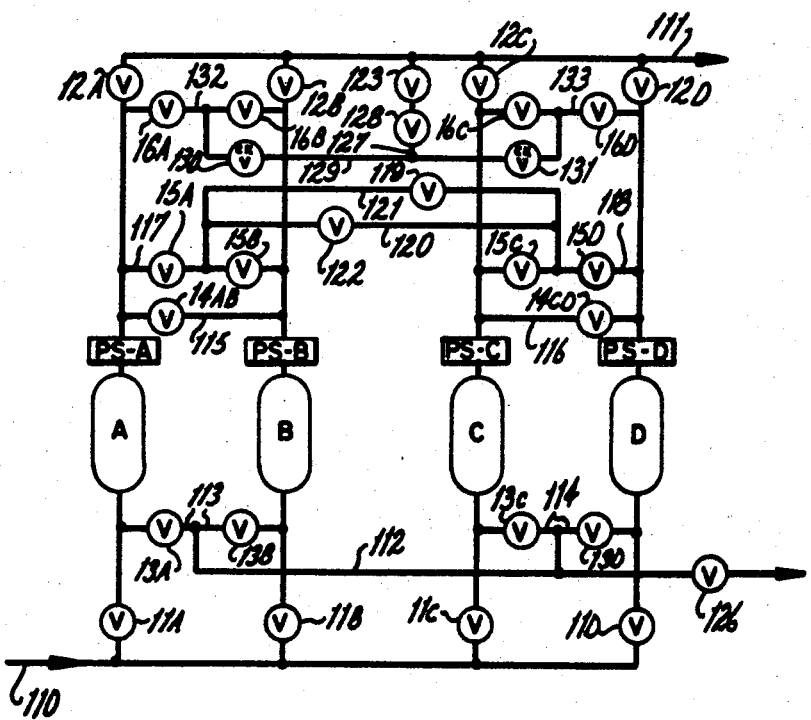
FIG. 2 is a schematic flowsheet of adsorption zone apparatus suitable for practicing the process of the invention.

FIG. 2 is a schematic flowsheet of adsorption zone apparatus such as may be employed in the adsorption zone of the above-described FIG. 1 system to practice the process of the instant invention. The drawing shows four adsorbent beds of activated carbon selective adsorbent material, A, B, C and D connected in parallel flow relation between feed gas mixture manifold 110 and unadsorbed product effluent gas manifold 111. Automatic valves 11A, 11B, 11C and 11D direct feed gas flow respectively to first bed A, second bed B, third bed C and fourth bed D. Automatic valves 12A, 12B, 12C and 12D, respectively, direct product gas from the same beds into product manifold 111.

The adsorbed components are rejected by countercurrent depressurization and purge through waste manifold 112 at the inlet end of the beds. Adsorbers A and B are joined at their inlet ends to waste manifold 112 by conduit 113 having automatic valves 13A and 13B therein. Similarly adsorbers C and D are joined to waste manifold 112 at their inlet ends by conduit 114 having automatic valves 13C and 13D therein.

First stage pressure equilization conduit 115 is provided joining the discharge ends of adsorbers A and B; similarly first stage pressure equilization conduit 116 is provided joining the discharge ends of adsorbers C and D. To provide first stage pressure equilization, automatic valves 14AB and 14CD are located in conduits 115 and 116, respectively. Cocurrent depressurization for purge is accomplished through manifolds 117 and 118 containing respectively automatic valves 15A-B and 15C-D together with cross-over conduit 120 containing manual trim valve 122. The second stage pressure equilization step is accomplished through crossover conduit 121 which also connects manifolds 117 and 118 and contains automatic valve 119. Flow from the beds to waste manifold 112 is controlled by automatic valves 13A-D. Product for final repressurization of the beds returns through conduit 127 containing regulating valves 123 and 128, then flows through repressurization manifold 129 containing check valves 130 and 131, and finally passes through one of manifolds 132 and 133 containing respectively automatic valves 16A-B and 16C-D.

It has been previously indicated that the adsorption step, in which methane and ammonia are selectively adsorbed together with adsorption of nitrogen and argon, is terminated when the methane adsorption front is entirely within the bed. This point may be determined in a manner well known to those skilled in the art, using the feed conditions and composition and the adsorbent's capacity and dynamic characteristics. After the first pressure equilization step and the cocurrent depressurization step, the second equilization step is carried out past the methane breakthrough point with the emerging gas being used for repressurization. As used herein, the term "methane breakthrough" means that point in the second pressure equalization step at which the concentration of methane in the void space gas released from the discharge end of the adsorbent bed increases to a level of at least 4 percent by volume. As previously indicated, breakthrough operation in the second pressure equalization step unexpectedly permits high recovery of hydrogen and nitrogen to be achieved without excessive contamination of the recovered hydrogen and nitrogen effluent product gas by the inert methane and argon constituents. Breakthrough may for example be identified by monitoring the adsorbable concentration in the discharge gas, and detecting the moment at which this concentration appreciably increases. The purge step is most efficiently performed by removing only the adsorbable constituents deposited in the preceding step. That is, the bed is not completely cleaned of all adsorbables by the purge fluid, but the latter's countercurrent flow insures that the adsorption front is pushed back towards the inlet end. This assists in maintaining a clean product during the succeeding adsorption step.

Figure 3:
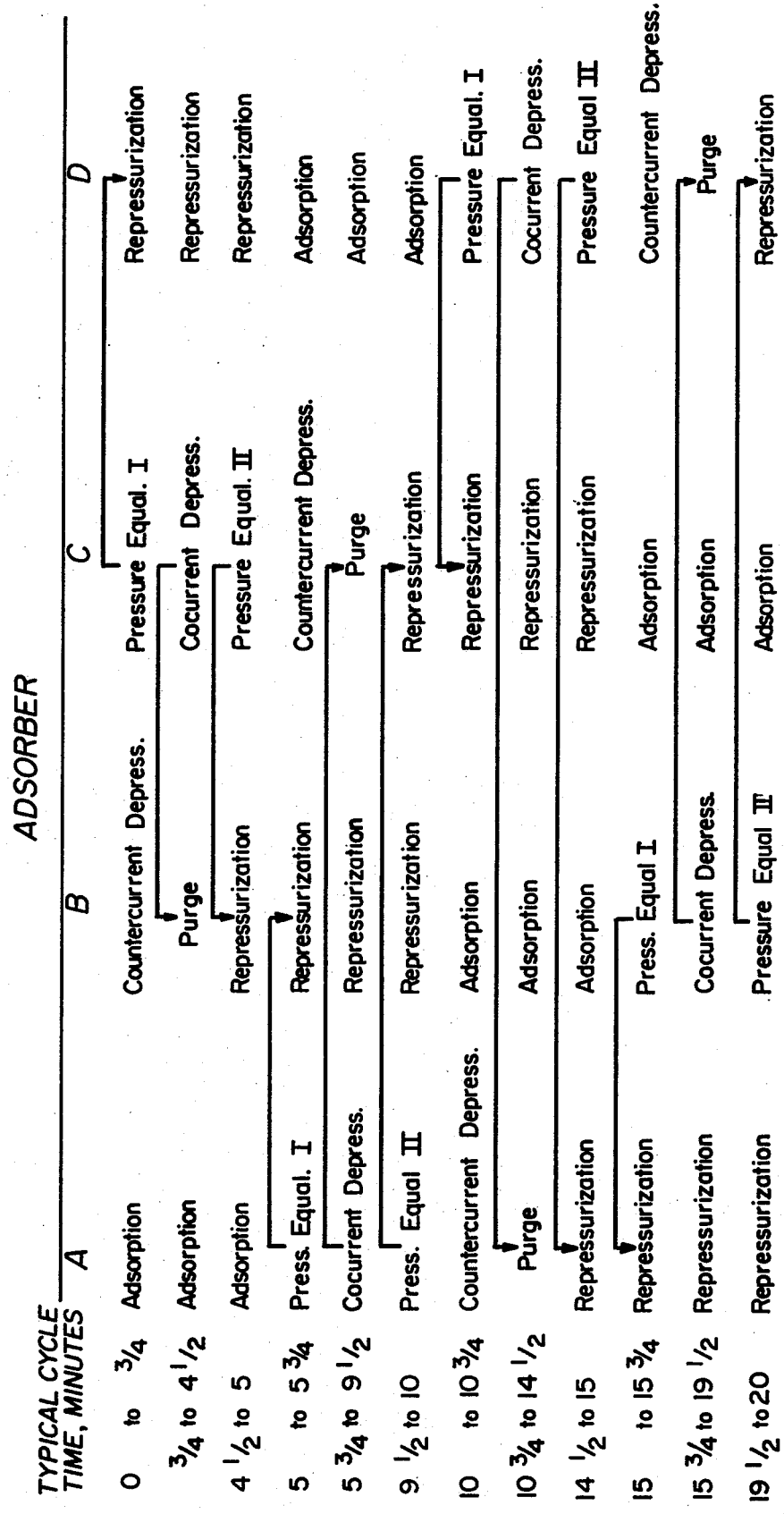
FIG. 3 is a cycle and illustrative time program for the process of the invention.

The use of the FIG. 2 system to practice the invention will be more easily understood by reference to the FIG. 3 cycle and time program. There are seven distinct steps each involving commencement and/or termination of flows. All gas flows associated with the four beds are indicated on the figure.

Four adsorbent beds are needed to match, time-wise, those steps in which cocurrent depressurization streams become available with those steps which can utilize these streams. Otherwise large holdup tanks would be required. It will be apparent from FIG. 3 that at any moment of time, one of the adsorbent beds is on its adsorption step delivering product at substantially constant pressure to the product manifold 111. At the same moment the other three beds are being cocurrently depressurized, or first or second stage pressure equalized, cleaned of the adsorbed component, and/or repressurized respectively for the succeeding adsorption step. One of the beds is always receiving product gas for repressurization so that the consumption of product for this purpose is continuous rather than intermittent.

In the process cycle time program shown in FIG. 3 and in terms of any single bed, adsorption accounts for one-fourth of the total cycle, first and second pressure equalization and cocurrent depressurization account for one-fourth, and countercurrent depressurization, purge, and repressurization for the remaining one-half. The utilization within the system of the pressure equalization and cocurrent depressurization gas is indicated by horizontal flow lines. Each first (I) pressure equalization step is connected horizontally with a repressurization step in another bed having already been partially repressurized, and each second (II) pressure equalization step is connected horizontally with a repressurization step of a different bed having just been purged. Each cocurrent depressurization step is connected horizontally with a purge step in a different bed.

Each step in the cycle of bed A will now be outlined and related to those components of FIG. 2 which are involved in the cycle changes. Pressures illustrative of such operation are included. It will be recognized that the pressure levels and step times in the following description are illustrative in character and are not intended to be limiting in any sense as regards the pressure levels and step times which may satisfactorily be employed in the practice of the present invention. The full cycle described for bed A is typical for all beds. Cycle times are in minutes.

Time 0 to 5: Bed A is on adsorption at 400 psig. Valves 11A and 12A are open and all other valves associated with bed A are closed. Feed gas mixture at 400 psig flows from feed manifold 110 to the inlet end of the first bed for flow therethrough, and unadsorbed product effluent comprising hydrogen, nitrogen and argon flows from the discharge end of the bed into manifold 111. Flow continues at steady feed (first highest) pressure for 5 minutes, with selective adsorption of ammonia and methane and also adsorption of nitrogen and argon, so that a methane adsorption front is established at the inlet end of the bed and moves progressively toward the discharge end thereof.

Time 5 to $5\frac{3}{4}$: The flow of feed gas mixture is terminated with the methane adsorption front entirely within bed A so that the bed remains filled with void space gas at the first highest pressure, by closing valves 11A and 12A. Simultaneously, valve 14AB opens to commence the first stage pressure equalization between first bed A and second bed B. At this moment, all other valves associated with bed B are closed except valve 16B. In this manner, the first and second beds are first pressure equalized at the higher intermediate pressure of 230 psig by release of void space gas from the discharge end of bed A and flow of same to the discharge end of bed B which has previously been partially repressurized to the lower intermediate pressure of 55 psig.

Time $5\frac{3}{4}$ to $9\frac{1}{2}$: When pressures in beds A and B have equalized at the higher intermediate pressure level, valve 14AB closes and valves 15A, 15C, 13C and 126 open to establish flow between beds A and C through manifold 120. By such flow the first bed is cocurrently depressurized with the release of further void space gas from the discharge end of bed A. The gas from bed A is throttled by valve 122 to the lowest process pressure of about 20 psig and flowed into the discharge end of third bed C. Bed C is partially loaded with methane, having just completed countercurrent blowdown, and is now countercurrently purged by gas from bed A at the lowest pressure.

Time $9\frac{1}{2}$ to 10: At the end of the purge step for third bed C, first bed A will have depressurized to 100 psig. This terminal pressure is sensed by a pressure switch PS-A which is actuated to close valve 13C and open valve 119. Flow continues from bed A to bed C but now bed C is dead-ended so that pressures equalize at 55 psig. Thus, the first bed A is second pressure equalized with the third bed C at the lower intermediate pressure of 55 psig for partial repressurization of the third bed and such equalization is carried out by releasing sufficient additional void space gas from the first bed discharge end for methane breakthrough.

Time 10 to $10\frac{3}{4}$: Valves 15A, 15C, 119 and 126 close and valve 13A opens for reduction of the inlet pressure of the first bed A thereby countercurrently desorbing part of the adsorbate and discharging same through the inlet end of the bed to waste manifold 112. The countercurrent depressurization discharge of gas is continued until the first bed A is at the lowest process pressure of 20 psig. The final lowest pressure is set by a regulating valve (not shown) downstream in waste conduit 112, which delivers the gas to a catalytic reformer fuel header. Valve 126 is a resistance valve rather than a shut-off valve and when closed, imposes a flow restriction which prevents excess flow velocities in bed A.

Time $10\frac{3}{4}$ to $14\frac{1}{2}$: After countercurrent depressurization of bed A is complete, purge gas for the first bed A is obtained from cocurrent depressurization of fourth bed D which is between its two pressure equalization steps. Valves 126, 15A and 15D open to allow flow of gas from bed D through manifold 120 to bed A, for introduction of cocurrent depressurization void space gas from the fourth adsorbent bed at the lowest pressure of 20 psig to the discharge end of the first bed for flow therethrough countercurrent to the previously flowing gas mixture so as to purge at least part of the remaining adsorbate and remove same through the inlet end of bed A to waste manifold 112. Valve 122 throttles and limits the flow of purge gas so that bed A remains at 20 psig. Valve 126 in the waste conduit 112 is reopened during this step so as to minimize flow resistance to the low pressure purge gas.

Time $14\frac{1}{2}$ to 15: Bed A has completed its adsorption phase, its product recovery phase and its desorption phase. It is now ready to begin a three-step repressurization sequence. Valve 13A closes and flow from bed D continues but with bed A dead-ended so that additional void space gas is introduced from the fourth bed D to the first bed A for partial repressurization thereof until the first and fourth beds are pressure equalized at the lower intermediate pressure of 55 psig as the fourth bed's second pressure equalizing step. During this initial phase of repressurization, valve 16A also opens to simultaneously permit product from manifold 111 to return through valves 123 and 128 to bed A.

Time 15 to $15\frac{3}{4}$: The next phase of bed A repressurization is accomplished by higher pressure equalization with second bed B which has just completed its adsorption step and is initially at full feed pressure. Valves 15A and 15D close and valve 14AB opens for introduction of void space gas from the second bed B to the first bed discharge end for further repressurization thereof until the first and second beds are pressure equalized at the higher intermediate pressure of 230 psig as the second bed first pressure equalizing.

Time $15\frac{3}{4}$ to 20: The final phase of bed A repressurization to substantially feed pressure is accomplished with product gas discharged from third bed C through manifold 111. Valve 14AB closes and valve 16A is opened to admit the product effluent gas from the third bed to the first bed discharge end for final countercurrent repressurization to raise the pressure from the higher intermediate pressure of 230 psig to substantially feed pressure of 400 psig. In preferred practice, this final phase of repressurization using product gas commences during time 15 to $15\frac{3}{4}$ and proceeds simultaneously with the first higher pressure equalization step of bed B. Such overlapping of the two sources of repressurization gas is advantageous because its smooths the internal utilization of product and avoids fluctuations of product flow and pressure. When bed A reaches the pressure level of manifold 129, valve 16A is closed and the bed is again ready to receive feed gas for separation. Alternatively, a portion of the feed gas itsef could be used in the final repressurization in connection with the introducion of product effluent from the third bed to the first bed for final countercurrent repressurization to pressure above the higher intermediate pressure.

This completes a full 20-minute cycle for bed A which is now ready to again receive feed gas mixture for the adsorption stroke with valve 16A closed and valves 11A and 12A opened. The cycle for bed A is typical for all beds A-D, and the beds are placed on adsorption sequentially in ¼-cycle phase relationship such that feed and product flows are continuous. In the process, the sequence of placing beds onstream for adsorption is A, D, B and C, i.e., the first, fourth, second and third beds.

As mentioned earlier herein, the present invention is based in part on the discovery that although activated carbon has roughly the same selectivity for nitrogen and argon, it may effectively be used to achieve higher recovery of nitrogen and hydrogen from ammonia plant purge gas in a two-step pressure equalization adiabatic pressure swing adsorption process than other adsorbents. The unique suitability of activated carbon as an adsorbent in the process of the invention is shown by a series of tests in which activated carbon was evaluated against various other adsorbent materials for adsorbent enrichment of argon, nitrogen and methane from a simulated ammonia plant purge gas of the following composition: argon = 4.3 volume percent, methane = 12.1 volume percent, nitrogen = 20.9 volume percent and the balance hydrogen. This gas composition was based on an estimated average composition of ammonia plant purge gas passed to the adiabatic pressure swing adsorption zone, but without any ammonia content. The adsorbent materials evaluated in this test were activated carbon, silica gel, activated alumina and 5A molecular sieve.

In the test an 80 gram sample of each adsorbent was evaluated for sorption characteristics. The simulated ammonia plant purge gas, at 400 psig pressure and 70° F temperature, was passed through the sample until an apparent equilibrium was achieved at which the measured composition of the effluent gas passed through the adsorbent was approximately equal to the composition of the feed gas mixture. Next, the adsorbent sample was depressurized at a constant rate from 400 to 25 psig, at which point a sample of the depressurized gas was withdrawn. The composition of the withdrawn sample at 25 psig was then measured as the final depressurization composition. The results of this test are given below in Table I, in which the enrichment factor, calculated for each of the methane, argon and nitrogen constituents as the ratio of the final concentration measured in the final depressurization gas to the initial concentration measured in the effluent gas at the point of approximate equilibrium with the feed gas mixture, is tabulated for each of the adsorbent materials.

Table I

Enrichment Factors for Synthetic Ammonia Plant Purge Gas on Various Adsorbents

| Adsorbent Material | Enrichment Factor for Gas Constituent: | | |
|---|---|---|---|
| | methane | argon | nitrogen |
| Activated Carbon | 3.26 | 1.59 | 1.52 |
| Silica Gel | 2.32 | 1.30 | 1.37 |
| Activated Alumina | 1.64 | 1.09 | 1.14 |
| 5A Molecular Sieve | 2.56 | 1.19 | 1.89 |

The calculated enrichment factors provide a measure of the ability of a given adsorbent to separate the tabulated gas constituents by pressure swing adsorption. Since the desired objective is to achieve the greatest possible separation of nitrogen and hydrogen from argon and methane, the most advantageous relation of enrichment factors would be in the sequence of methane > nitrogen > argon. For the activated carbon adsorbent, the sequence of enrichment factors was methane > argon ≅ nitrogen. In other words, all other adsorbent materials tested sorbed nitrogen to a greater degree than argon. Activated carbon, by contrast, shows approximately equal selectivity for both argon and nitrogen. Although these sorption characteristics of activated carbon do not appear particularly advantageous, it has been found that the use of activated carbon adsorbent in the two-stage pressure equalization adsorption process of this invention permits high recovery levels of hydrogen and nitrogen to be achieved, whereas it is apparent from the foregoing data that the other adsorbent materials evaluated would yield poor nitrogen recovery levels in such process, concomitant with excessively high levels of inert argon in the unadsorbed product effluent gas from such process.

Figure 4:
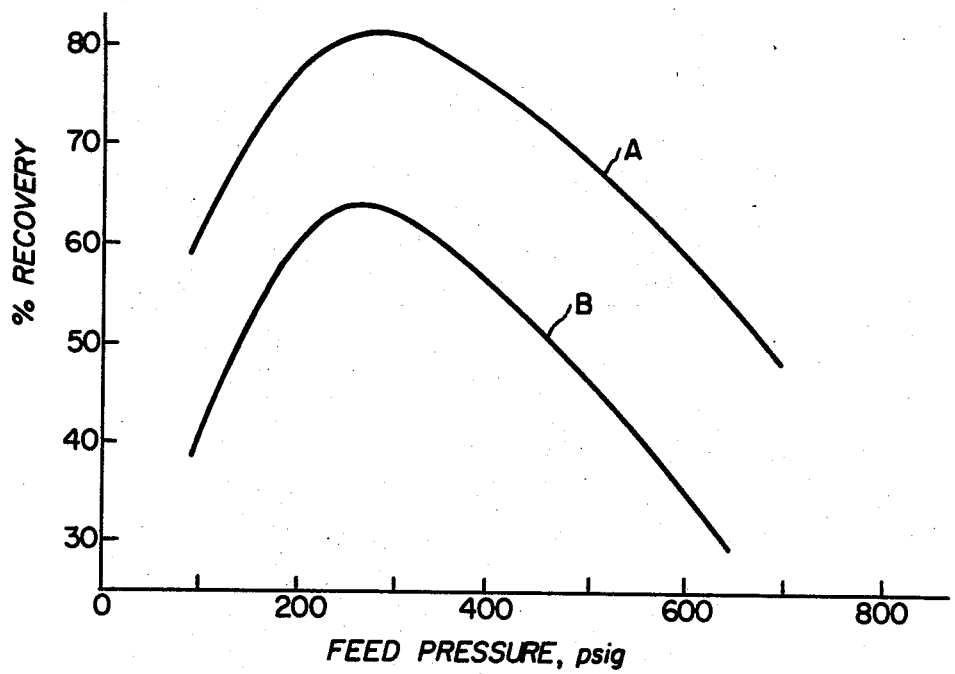
FIG. 4 is a graph showing hydrogen and nitrogen recovery plotted against feed gas pressure for the process of the invention.

FIG. 4 is a graph showing the importance of feed gas mixture pressure on the effectiveness of the recovery achieved by the process of the invention. The graph shows recovery of hydrogen (curve A) and nitrogen (curve B) plotted as a function of feed gas mixture pressure (= adsorption pressure) for the process. The curves in FIG. 4 are based on measurements made in treatment of purge gas from a 600 ton/day ammonia plant by an adsorption zone operated in accordance with the process of this invention. The adsorption zone comprised four identical vertically oriented adsorbent beds each containing activated carbon adsorbent. The adsorbent was a granular activated carbon with a surface area in the range of 1050 to 1150 meters$^2$/gram, an Ergon particle diameter of 0.0075 ft. and a bulk density of 32-33 pounds per cubic foot. The approximate composition (by volume) of the purge gas passed to the adsorption zone was as follows: argon—5%, nitrogen—21%, methane—10%, ammonia—5%, and hydrogen and helium—59%.

To generate the data represented by curves A and B in FIG. 4, the above-described adsorption zone was operated on a 20 minute cycle according to the present invention, substantially identical to the cycle previously described in connection with FIGS. 2 and 3. During the operation of this adsorption system, performance was evaluated over various feed gas pressure and waste gas (purge) pressure levels. FIG. 4 shows that at feed gas pressure levels below about 100 psig, the hydrogen recovery represented by curve A and the nitrogen recovery represented by curve B tend toward unacceptably low levels due to the adsorption characteristics of the process at low pressure which result in high rejection of both hydrogen and nitrogen in the waste gas discharged from the process. Similarly at high feed gas mixture pressure levels, above about 500 psig, excessive amounts of hydrogen and nitrogen are adsorbed and stored in the adsorbent bed and are lost during regeneration (countercurrent depressurization and purging) of the bed, resulting in excessively reduced recovery levels for those constituents. Thus, in practice, to achieve suitably high nitrogen and hydrogen recovery in the process of the invention—i.e., nitrogen recovery of at least about 50% and hydrogen recovery of at least about 65%—the feed gas mixture pressure (adsorption pressure) is desirably maintained in the range of from 150 to 450 psig. Preferably, the feed gas mixture pressure is in the range of from 300 to 450 psig to match the synthesis gas comprisser suction pressure.

Figure 5:
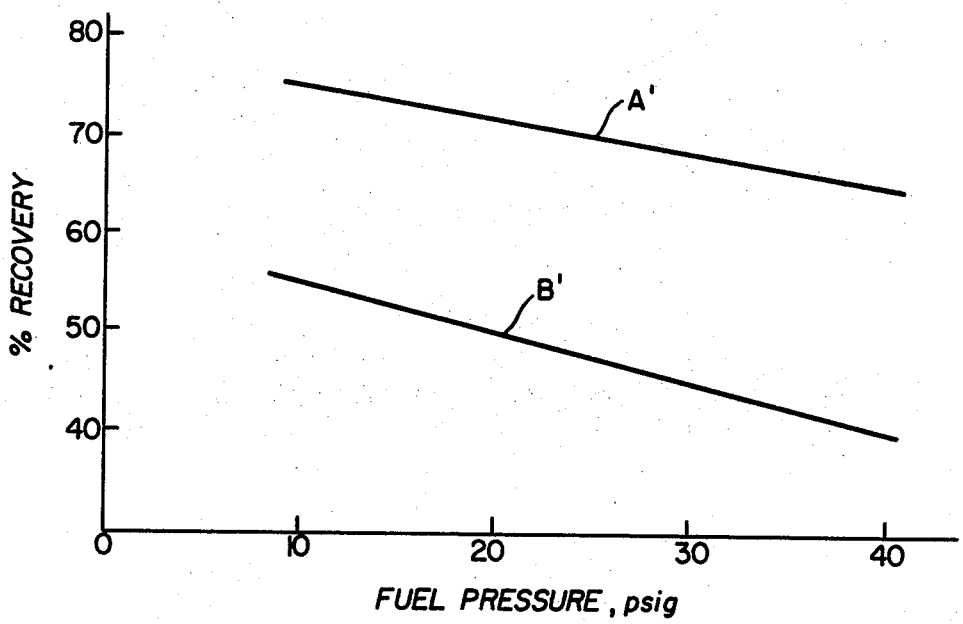
FIG. 5 is a graph of hydrogen and nitrogen recovery plotted against the pressure at which the adsorbent is purged at lowest pressure in the process of the invention, for an adsorption step pressure of 400 psig.

Recovery performance is also improved by operating at very low waste gas (purging) pressure levels, as indicated by FIG. 5. The graph in this drawing shows hydrogen recovery (curve A') and nitrogen recovery (curve B') as a function of waste gas feed manifold pressure, for the adsorption system described in connection with FIG. 4, operating at a feed gas mixture pressure of 400 psig. As shown by FIG. 5, hydrogen-nitrogen recovery increases as much as 10% (equivalent to an additional 8-10 tons/day of recoverable ammonia for an 1150 ton/day ammonia plant) when operating at 20 psig purging pressure as compared with operation at 40 psig. Accordingly, to achieve comparatively high levels of hydrogen and nitrogen recovery, it is preferred to operate the process of this invention with a purging pressure, i.e. lowest process pressure, of less than about 25 psig.

Figure 6:
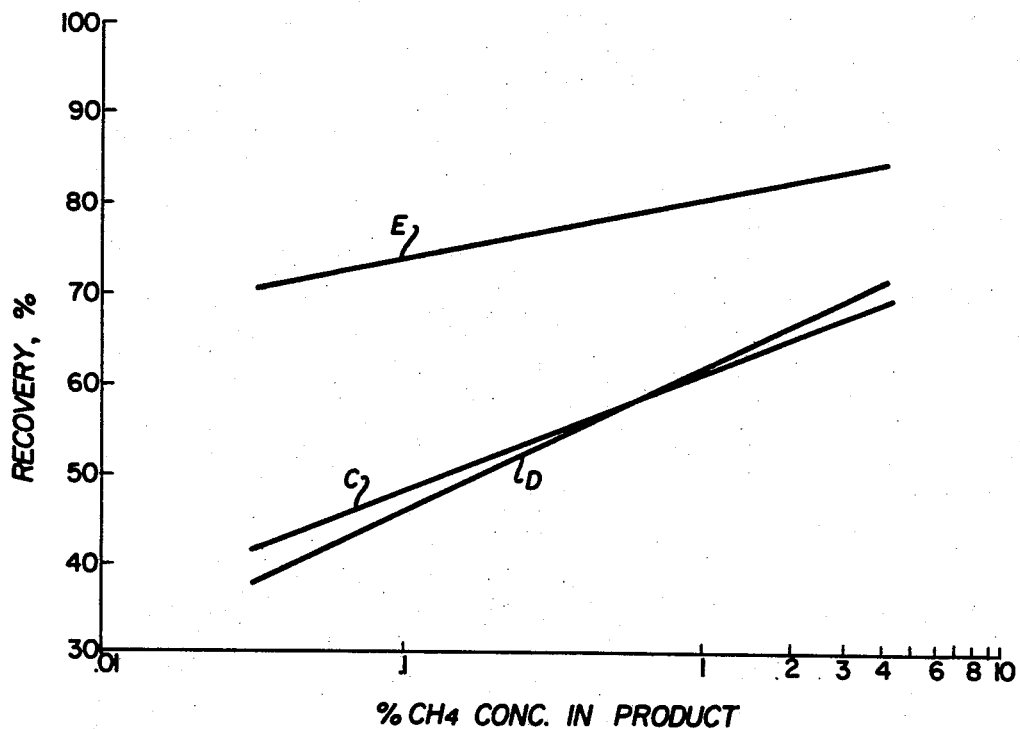
FIG. 6 is a graph of hydrogen, nitrogen and argon recovery plotted as a function of the percent methane concentration in the product gas withdrawn from the adsorption zone.

FIG. 6 shows recovery data for the above-described adsorption system of FIGS. 4 and 5 plotted as a function of volume percent methane in the product effluent from the process. The data in FIG. 6 are based on operation at a feed gas pressure of 400 psig. and purging step pressure of 20 psig. Curve C represents nitrogen, curve D represents argon and curve F represents hydrogen. As shown by this graph, the recoveries of hydrogen, nitrogen and argon are strongly affected by the amount of methane present in the product effluent withdrawn from the adsorption zone. Low levels of methane returned in the product result in lower recoveries of hydrogen, nitrogen and argon. Recovery of these constituents improves as higher levels of methane are passed into the product effluent in the adsorption step. Higher recovery, i.e., lower rejection rate of argon means more gas has to be withdrawn from the circulation loop to achieve the required net rejections of argon and methane in the overall process. This in turn results in lowering of the net recoveries for hydrogen and nitrogen.

Based on these considerations, it is preferred to operate the process of this invention so as to maintain the concentration of methane in the unadsorbed product effluent within the range of from 0.1 to 2.5 volume percent and preferably in the range of between 0.1 and 1.0 volume percent, in order to maintain suitably high net nitrogen-hydrogen recovery.

Figure 7:
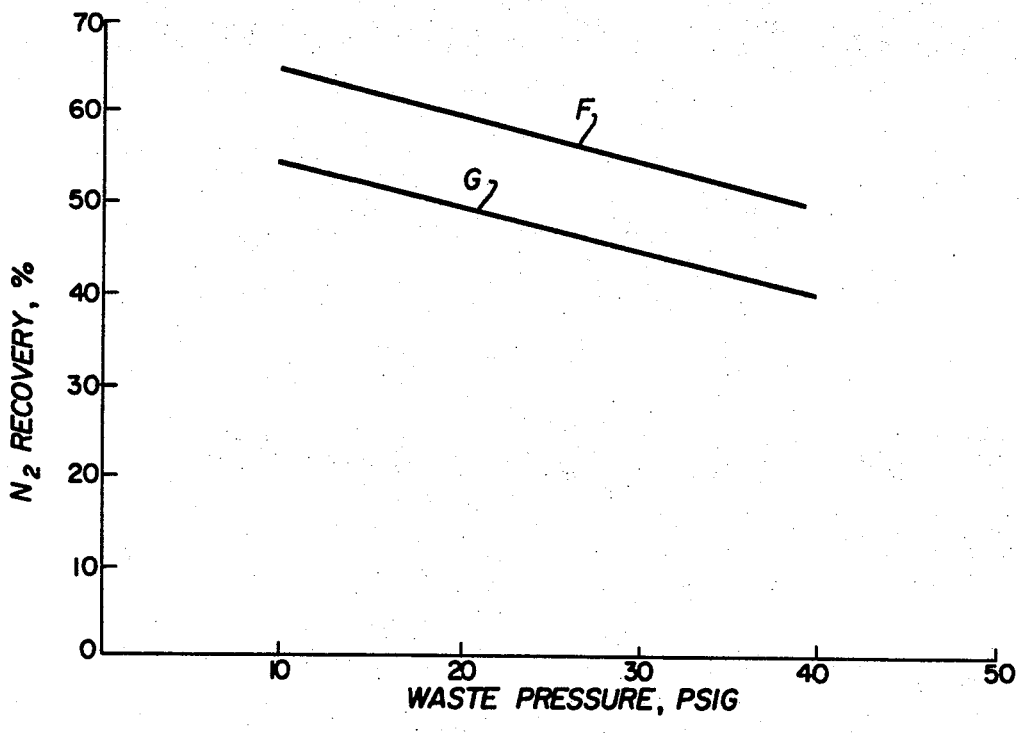
FIG. 7 is a graph showing nitrogen recovery as a function of the purge pressure level, for product methane concentrations of 1 and 0.1 percent by volume.

FIG. 7 is a graph showing nitrogen recovery as a function of the purge pressure level, for product methane concentrations of 1 percent (curve F) and 0.1 percent (curve G), in the previously described adsorption system from which the data of the graphs in FIGS. 4-6 was derived. The FIG. 7 graph, based on a feed gas mixture adsorption pressure of 400 psig., further illustrates the beneficial effects of low purge pressure (<25 psig.) and low product effluent methane concentration (0.1 to 1 volume percent) in the process of the present invention.

Figure 8:
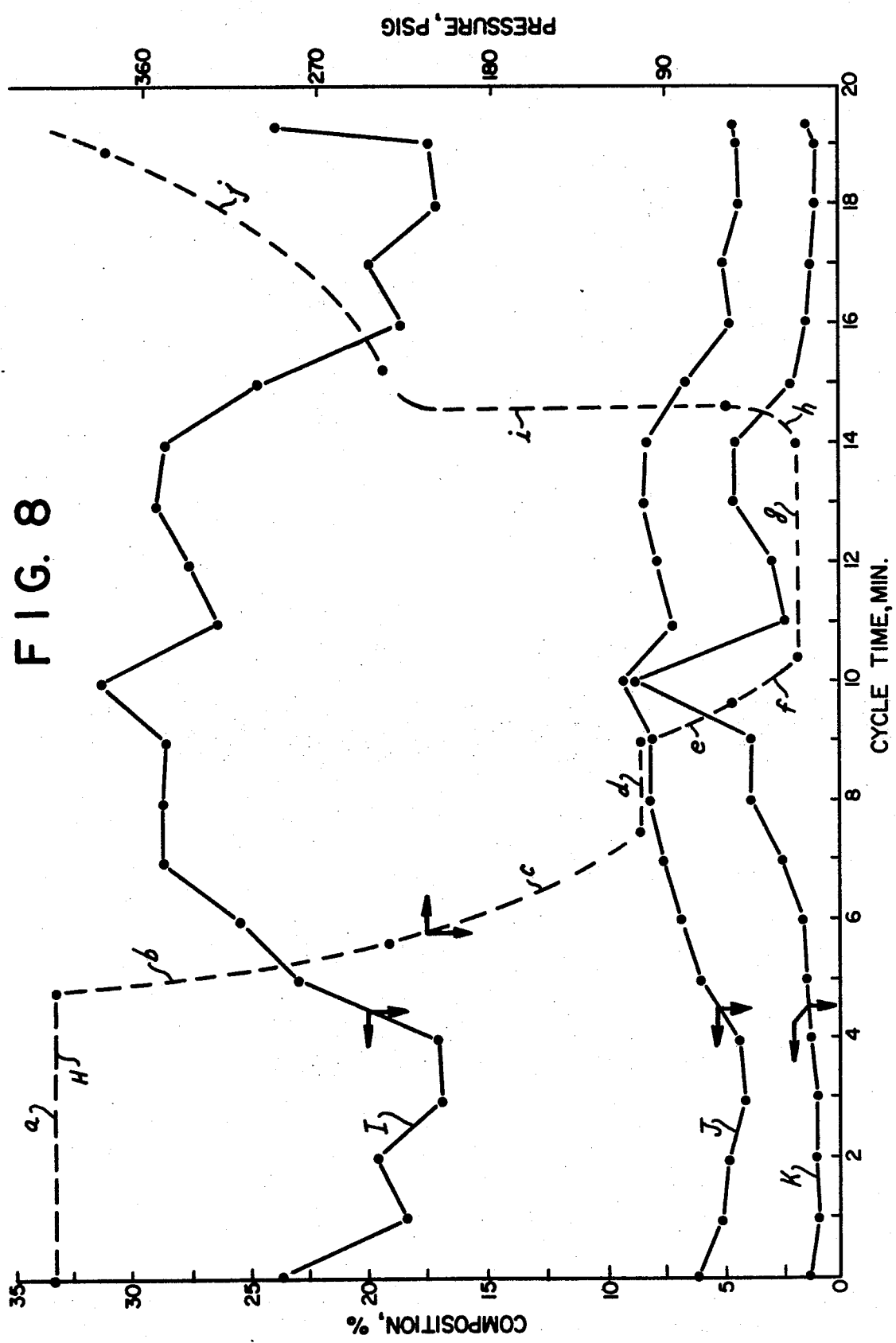
FIG. 8 is a graph showing pressure and concentration of nitrogen, argon and methane measured at the product end of an adsorbent bed during a 20 minute cycle embodiment of the invention.

FIG. 8 is a graph showing pressure (curve H) and concentration of nitrogen (curve I), argon (curve J) and methane (curve K) measured at the product end of an adsorbent bed during a 20 minute cycle embodiment of the invention. The process for the FIG. 8 graph employed a feed gas mixture adsorption pressure of 400 psig., a purging pressure of 20 psig., with a feed gas composition (by volume) of nitrogen = 21.2%, argon = 5.3%, methane = 9.9%, ammonia = 5.3% and hydrogen = 59.3%. The pressure curve H in FIG. 8 consists of the discrete labelled segments $a$ through $j$, corresponding to the cycle process steps as identified below:

$a$ = adsorption
$b$ = pressure equalization I
$c$ = cocurrent depressurization
$d$ = isolation
$e$ = pressure equalization II
$f$ = countercurrent depressurization
$g$ = purge
$h$ = repressurization (eq. II)
$i$ = repressurization (eq. I)
$j$ = repressurization by product effluent gas As shown by the pressure curve H and the methane concentration curve K in FIG. 8, breakthrough of methane during the second pressure equalization step, corresponding to segment $e$ of curve H, is clearly apparent, with the measured methane concentration sharply increasing from about 1.25% at the beginning of the second pressure equalization to about 6.5% at the end thereof.

The ammonia plant purge gas treatment process of this invention may be advantageously implemented either to increase the ammonia production capacity of the ammonia plant operating on a fixed supply rate of ammonia synthesis feed gas or alternatively, the invention may be employed to take advantage of a reduced synthesis feed gas requirement for a fixed output plant. For ammonia plants facing curtailment of the natural gas supply, the purge gas recovery process of this invention helps to maintain maximum ammonia production by yielding more ammonia from the available feedstock. The process is readily implemented in an existing ammonia plant with no changes to the plant other than to a portion of the fuel system to accomodate the purge waste gas from the process.

Although preferred embodiments of the invention have been described in detail it will be appreciated that other embodiments are contemplated only with modifications of the disclosed features, as being within the scope of the invention.

What is claimed is:

1. In a process for separating gas mixtures comprising 1-7 volume precent ammonia, 3-8 volume percent argon, 6-12 volume percent methane, 16-25 volume percent nitrogen and the balance hydrogen by selectively adsorbing methane in an adsorption zone at a higher pressure and desorbing methane by pressure reduction to lower pressure, the improvement of recovering hydrogen and nitrogen from said gas mixture in a two-pressure equalization adsorption cycle utilizing activated carbon as a selective adsorbent material, said activated carbon adsorbent material being capable of rejecting substantial amounts of argon and methane inert constituents per unit amount of hydrogen and nitrogen recovered yet having the apparently disadvantageous characteristic of roughly equal selectivity for nitrogen and argon, but wherein said two-pressure equalization adsorption cycle is utilized to realize high recovery of nitrogen by operating beyond methane breakthrough in the second pressure equalization step without adverse effect on the product gas composition, comprising the steps of:

(a) providing four beds of activated carbon selective adsorbent material each with inlet and discharge ends;

(b) introducing said gas mixture to the inlet end of a first bed at first highest superatmospheric pressure for flow therethrough with selective adsorption of ammonia and methane and also adsorption of nitrogen and argon and discharge of unadsorbed product effluent comprising hydrogen, nitrogen and argon from the discharge end, continuing such flow so that a methane adsorption front is established at said inlet end and moves progressively toward the discharge end, and terminating such flow when said methane adsorption front is entirely within said first bed so that the bed remains filled with void space gas at said first highest pressure;

(c) first pressure equalizing said first bed with a second bed at higher intermediate pressure by releasing void space gas from the first bed discharge end and flowing same to the discharge end of the second bed having previously been partially repressurized to lower intermediate pressure;

(d) cocurrently depressurizing said first bed by releasing further void space gas from the discharge end and flowing same into the discharge end of a third bed partially loaded with said methane for countercurrent purging thereof at a lowest pressure;

(e) second pressure equalizing said first bed with said third bed at lower intermediate pressure by releasing sufficient additional void space gas from the first bed discharge end for methane breakthrough and flowing same to the third bed immediately after purging the adsorbate therefrom at said lowest pressure for partial repressurization of the third bed to lower intermediate pressure:

(f) reducing the inlet end pressure of said first bed thereby countercurrently desorbing part of the adsorbate and discharging same through said inlet end, and continuing the discharge until said first bed is at said lowest pressure;

(g) introducing cocurrent depressurization void space gas from a fourth adsorbent bed to the discharge end of said first bed for flow therethrough countercurrent to the previously flowing gas mixture so as to purge at least part of the remaining adsorbate at said lowest pressure and remove same through the bed inlet end;

(h) introducing additional void space gas from said fourth adsorbent bed to said first bed for partial repressurization thereof until said first and fourth beds are pressure equalized at lower intermediate pressure as the fourth bed second pressure equalizing;

(i) introducing void space gas from said second bed to the first bed discharge end for further repressurization thereof until said first and second beds are pressure equalized at higher intermediate pressure as the second bed first pressure equalizing;

(j) introducing product effluent from said third bed to the first bed discharge end for final countercurrent repressurization thereof to pressure above said higher intermediate pressure;

(k) reintroducing said gas mixture to the inlet end of the repressurized first bed in a manner analogous to step (b) and thereafter consecutively repeating steps (c) through (j); and (1) consecutively following the sequence of steps (b) through (k) with the fourth, second and third beds in accordance with the flow cycle sequence of FIG. 3.

2. A process according to claim 1 wherein said first highest pressure of step (b) is in the range of from 150 to 450 psig.

3. A process according to claim 1 wherein said lowest pressure of step (f) is less than about 25 psig.

4. A process according to claim 1 wherein step (b) is conducted so as to maintain the concentration of methane in the unadsorbed product effluent within the range of from 0.1 to 2.5 volume percent.

5. A process according to claim 4 wherein said concentration of methane in the unadsorbed product effluent is between 0.1 and 1.0 volume percent.

6. A process according to claim 1 wherein said gas mixture comprises 2-4 volume percent ammonia, 4-6 volume percent argon, 10-12 volume percent methane, 19-23 volume percent nitrogen and the balance hydrogen.

7. In a process for separating gas mixtures comprising 1-7 volume percent ammonia, 3-8 volume percent argon, 6-12 volume percent methane, 16-25 volume percent nitrogen and the balance hydrogen by selectively absorbing methane in an adsorption zone at a higher pressure and desorbing the methane by pressure reduction to lower pressure, the improvement of recovering hydrogen and nitrogen from said gas mixture in a two-pressure equalization adsorption cycle utilizing activated carbon as a selective adsorbent material, said activated carbon adsorbent material being capable of rejecting substantial amounts of argon and methane inert constituents per unit amount of hydrogen and nitrogen recovered yet having the apparently disadvantageous characteristic of roughly equal selectivity for nitrogen and argon, but wherein said two-pressure equalization adsorption cycle is utilized to realize high recovery of nitrogen by operating beyond methane breakthrough in the second pressure equalization step without adverse effect on the product gas composition, comprising the steps of:

(a) providing four beds of activated carbon selective adsorbent material each with inlet and discharge ends;

(b) introducing said gas mixture to the inlet end of a first bed at first highest superatmospheric pressure of from 150 to 450 psig for flow therethrough with selective adsorption of ammonia and methane and also adsorption of nitrogen and argon and discharge of unadsorbed product effluent comprising hydrogen, nitrogen and argon and containing between 0.1 and 1.0 volume percent methane from the discharge end, continuing such flow so that a methane adsorption front is established at said inlet end and moves progressively toward the discharge end, and terminating such flow when said methane adsorption front is entirely within said first bed so that the bed remains filled with void space gas at said first highest pressure;

(c) first pressure equalizing said first bed with a second bed at higher intermediate pressure by releasing void space gas from the first bed discharge end and flowing same to the discharge end of the second bed having previously been partially repressurized to lower intermediate pressure;

(d) cocurrently depressurizing said first bed by releasing further void space gas from the discharge end and flowing same into the discharge end of a third bed partially loaded with said methane for countercurrent purging thereof at a lowest pressure of less than about 25 psig;

(e) second pressure equalizing said first bed with said third bed at lower intermediate pressure by releasing sufficient additional void space gas from the first bed discharge end for methane breakthrough and flowing same to the third bed immediately after purging the adsorbate therefrom at said lowest pressure for partial repressurization of the third bed to lower intermediate pressure;

(f) reducing the inlet end pressure of said first bed thereby countercurrently desorbing part of the adsorbate and discharging same through said inlet end, and continuing the discharge until said first bed is at said lowest pressure;

(g) introducing cocurrent depressurization void space gas from a fourth adsorbent bed to the discharge end of said first bed for flow therethrough countercurrent to the previously flowing gas mixture so as to purge at least part of the remaining adsorbate at said lowest pressure and remove same through the bed inlet end;

(h) introducing additional void space gas from said fourth adsorbent bed to said first bed for partial repressurization thereof until said first and fourth beds are pressure equalized at lower intermediate pressure as the fourth bed second pressure equalizing;

(i) introducing void space gas from said second bed to the first bed discharge end for further repressurization thereof until said first and second beds are pressure equalized at higher intermediate pressure as the second bed first pressure equalizing;

(j) introducing product effluent from said third bed to the first bed discharge end for final countercurrent repressurization thereof to pressure above said higher intermediate pressure;

(k) reintroducing said gas mixture to the inlet end of the repressurized first bed in a manner analogous to step (b) and therafter consecutively repeating steps (c) through (j); and (1) consecutively following the sequence of steps (b) through (k) with the fourth, second and third beds in accordance with the flow cycle sequence of FIG. 3.

8. An ammonia synthesis process comprising the steps of catalytically reacting a synthesis feed gas mixture containing hydrogen and nitrogen in an approximately stoichiometric ratio and methane and argon inert constituents to yield ammonia product, separating the ammonia product from the reacted gas mixture to form an ammonia-depleted reacted gas mixture and recycling at least part of said ammonia-depleted reacted gas mixture to the catalytic reaction step, wherein a portion of said ammonia-depleted reacted gas mixture is separated by the process of claim 1 to recover product effluent gas containing hydrogen and nitrogen and reject waste gas containing ammonia, methane and argon, and said product effluent gas is circulated to the catalytic reaction step for enhancement of the yield of ammonia product therein.

9. A process according to claim 1 wherein said first highest pressure of step (b) is in the range of from 300 to 450 psig.

* * * * *